(12) United States Patent
Luan et al.

(10) Patent No.: US 7,815,889 B2
(45) Date of Patent: Oct. 19, 2010

(54) METHOD AND APPARATUS FOR PRESSURIZED CALCINATION OF GYPSUM

(75) Inventors: Wenqi Luan, Hawthorn Woods, IL (US); Qingxia Liu, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 12/388,793

(22) Filed: Feb. 19, 2009

(65) Prior Publication Data

US 2009/0257946 A1   Oct. 15, 2009

Related U.S. Application Data

(60) Provisional application No. 61/029,725, filed on Feb. 19, 2008, provisional application No. 61/107,901, filed on Oct. 23, 2008.

(51) Int. Cl.
*C01B 13/14* (2006.01)

(52) U.S. Cl. ................................. 423/638; 423/636

(58) Field of Classification Search ................. 423/638, 423/636

See application file for complete search history.

(56) References Cited

U.S. PATENT DOCUMENTS

| 3,648,994 | A | * | 3/1972 | Remmers et al. ............ 106/783 |
| 4,569,831 | A | | 2/1986 | Cohen |
| 4,919,613 | A | | 4/1990 | Watkins |
| 5,139,749 | A | | 8/1992 | White |
| 5,954,497 | A | * | 9/1999 | Cloud et al. ................. 432/13 |
| 6,491,501 | B1 | | 12/2002 | Wild et al. |
| 6,896,858 | B2 | | 5/2005 | Tatani et al. |
| 6,964,704 | B2 | | 11/2005 | Cox et al. |
| 7,175,426 | B2 | | 2/2007 | Bolind et al. |
| 7,393,424 | B2 | * | 7/2008 | Schwartz et al. ............. 156/39 |

* cited by examiner

*Primary Examiner*—Timothy C Vanoy
*Assistant Examiner*—Michelle Hou
(74) *Attorney, Agent, or Firm*—Greer, Burns & Crain, Ltd.; Philip T. Petti; Pradip K. Sahu

(57) ABSTRACT

A method for calcining gypsum in a pressurized reactor by injecting combustion gases and air into the pressurized reactor to create a fluidized bed of gypsum, and heating the fluidized bed of gypsum in the pressurized reactor sufficiently to form a calcined hemihydrate.

5 Claims, 6 Drawing Sheets

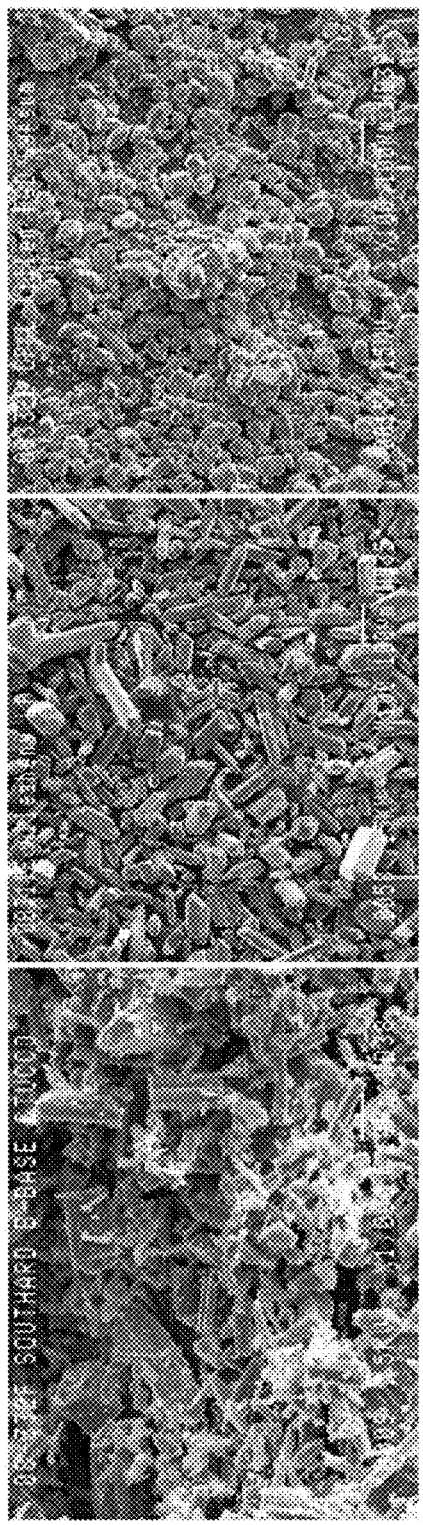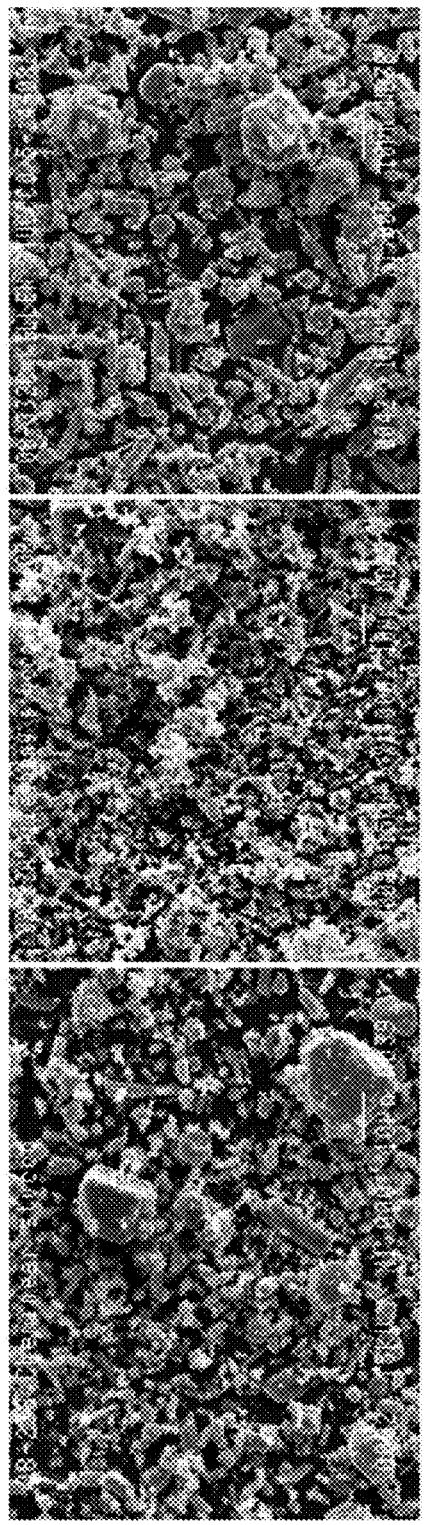

METHOD AND APPARATUS FOR PRESSURIZED CALCINATION OF GYPSUM

RELATED APPLICATION

This application claims priority under 35 USC 119(e) from U.S. Provisional application Ser. No. 61/029,725 filed Feb. 19, 2008 and Ser. No. 61/107,901 filed Oct. 23, 2008.

BACKGROUND

1. Technical Field

Improved techniques and equipment for the calcination of calcium sulfate dihydrate (sometimes known as gypsum or land plaster in the naturally occurring form, as syngyp in the synthetically derived form, or by the chemical formula $CaSO_4.2H_2O$) to primarily the alpha type of calcium sulfate hemihydrate ($CaSO_4.\frac{1}{2}H_2O$[alpha type]) are disclosed.

2. Description of the Related Art

Gypsum and calcium sulfate-based compositions and compounds are used in a wide variety of industries, including the construction industry. Calcium sulfate dihydrate is a naturally occurring mineral that can be mined. Additional sources of calcium sulfate dihydrate include synthetic gypsum generated from flue gas desulfurization of coal burning power plants (FGD gypsum) and various sources of recycled gypsum such as recycled wall board and gypsum recycled from casts or molds.

To render gypsum useful as a construction material, it can be calcined or heated to partially dehydrate it to the alpha and beta forms of calcium sulfate hemihydrate. The dehydration or calcination of raw gypsum to calcium sulfate hemihydrate can be represented by the following formula:

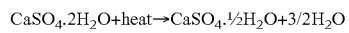

$$CaSO_4.2H_2O + heat \rightarrow CaSO_4.\tfrac{1}{2}H_2O + 3/2 H_2O$$

Calcination is the process where calcium sulfate dihydrate is converted to hemi-hydrate, soluble anhydrite, and/or insoluble anhydrite. A number of different techniques may be used to calcine gypsum. Calcination may be performed, for example, by flash drying at high temperatures, cooking in large kettles, heating in furnaces or rotary kilns, using steam, or cooking in aqueous suspensions. These different techniques can result in calcium sulfate products with a wide range of composition and properties, but generally two types of hemihydrates are formed: alpha-hemihydrate type and beta-hemihydrate type.

In a reversal of the calcination process described above, the hemihydrates are dissolved in water until they are saturated and the soluble hemihydrates are exothermically converted back to the less soluble dihydrate, which precipitates out of the solution thereby further driving the following reaction:

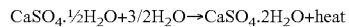

$$CaSO_4.\tfrac{1}{2}H_2O + 3/2 H_2O \rightarrow CaSO_4.2H_2O + heat$$

As the amount of dihydrate produced increases, the gypsum sets. The setting of the gypsum can be followed by measuring the heat evolved, represented by a gradual increase in slurry temperature.

Methods of improving the thermal efficiency of calcination of the hemihydrate have been accomplished, but typically rely on the use of an aridizing agent, such as the deliquescent salt $CaCl_2$, which acts to lower the calcining temperature. However, use of $CaCl_2$ as an additive is better suited to batch processes than continuous processes. Further, the addition of a salt can be deleterious to wallboard qualities such as plastic flow and the bond of paper to the gypsum core.

Alpha and beta hemihydrates can be distinguished from one another by the amount of water that is necessary to make a pourable slurry with the finely ground powdered hemihydrate. Alpha calcium sulfate hemihydrate, also referred to as alpha-hemihydrate requires less than about 50 mL per 100 g of plaster, while beta calcium sulfate hemihydrate, also referred to as beta-hemihydrate, requires substantially more water, normally more than 70 mL per 100 g of plaster. This amount of water is known as the "water demand." A high water demand, sometimes reflected as a water/stucco ratio (W/S), is less efficient from a wallboard production standpoint, since more energy is needed to remove the excess water in the board drying process. A large part of the energy is in increased fuel costs. Conventional beta-hemihydrate is more porous, and has a W/S ratio in the range of 0.7-0.8, while alpha-hemihydrate has a W/S ratio in the range of 0.32-0.45.

The alpha and beta forms of the hemihydrates also differ in crystal shape and density. Also, while alpha-hemihydrate, in its B-base form is typically made in a batch system, beta-hemihydrate is made in a continuous system. Despite the latter advantage, because of the lower water demand, alpha-hemihydrate is preferred over the beta-hemihydrate. However, current calcining techniques are relatively ineffective at producing the alpha-hemihydrate content of the calcium sulfate product. As a result, conventional gypsum wallboard manufacturers use beta-hemihydrate, produced by kettle or flash calcination under ambient pressure.

Employing alpha-hemihydrate in wallboard manufacturing would represent a significant savings in energy and production costs. Because the W/S ratio is much lower with alpha-hemihydrate, the fuel (typically natural gas) used to dry the board is reduced, and the wallboard production line speed can be increased, thus increasing production capacity. The combustion related polluting gas emissions are also reduced.

SUMMARY

The above-listed production concerns of commercial wallboard manufacturers are addressed by providing a method and apparatus for calcining gypsum under pressure to obtain alpha-hemihydrate through a continuous process. A pressurized reactor is provided including a heat source, preferably a heat exchanger, and an apparatus for injecting heated gas and air to create a fluidized bed. Mined gypsum or synthetic gypsum is injected into the reactor on a continuous basis for calcination in the reactor. In this manner, calcined alpha-hemihydrate is produced having a W/S ratio in the general range of 0.45-0.55. In the preferred embodiment, a second heat exchanger is provided, as is a reactor with an internal, heated auger apparatus. A continuous metering system is used to feed the gypsum to the reactor in a continuous process and to maintain pressure in the reactor. The present method also features a diversion of heated air from a heat source for the heat exchanger to also provide heated gas for the fluidized bed reactor.

More specifically, a method for calcining gypsum is provided. The gypsum is injected into a pressurized reactor. Combustion gases and air are also injected into the pressurized reactor to create a fluidized bed of gypsum. The gypsum is heated in the reactor sufficiently to form a calcined hemihydrate.

In another embodiment, an apparatus for continuously calcining gypsum is provided, including at least one gypsum hopper with a hopper inlet and a hopper outlet; the hopper outlet being in communication with a double valve feeder; and a pressurized reactor in communication with the double valve feeder.

In a still further embodiment, a method for calcining gypsum is provided, including the steps of continuously injecting gypsum into a pressurized reactor, heating the gypsum to form a calcined hemihydrate with a lower water demand hemihydrate, the calcined hemihydrate having a water/stucco ratio in the approximate range of 0.45-0.55.

BRIEF DESCRIPTION OF THE DRAWINGS

FIGS. 8a-f are Scanning Electron Microscopy (SEM) images of crystal structure before and after the present process.

It should be understood that the above drawings are not to scale. Details which are not necessary for an understanding of the disclosed methods and apparatuses by one of ordinary skill in the art or which render other details difficult to perceive may have been omitted. It should be understood, of course, that this disclosure is not limited to the particular embodiments illustrated herein.

DETAILED DESCRIPTION

Figure 1:
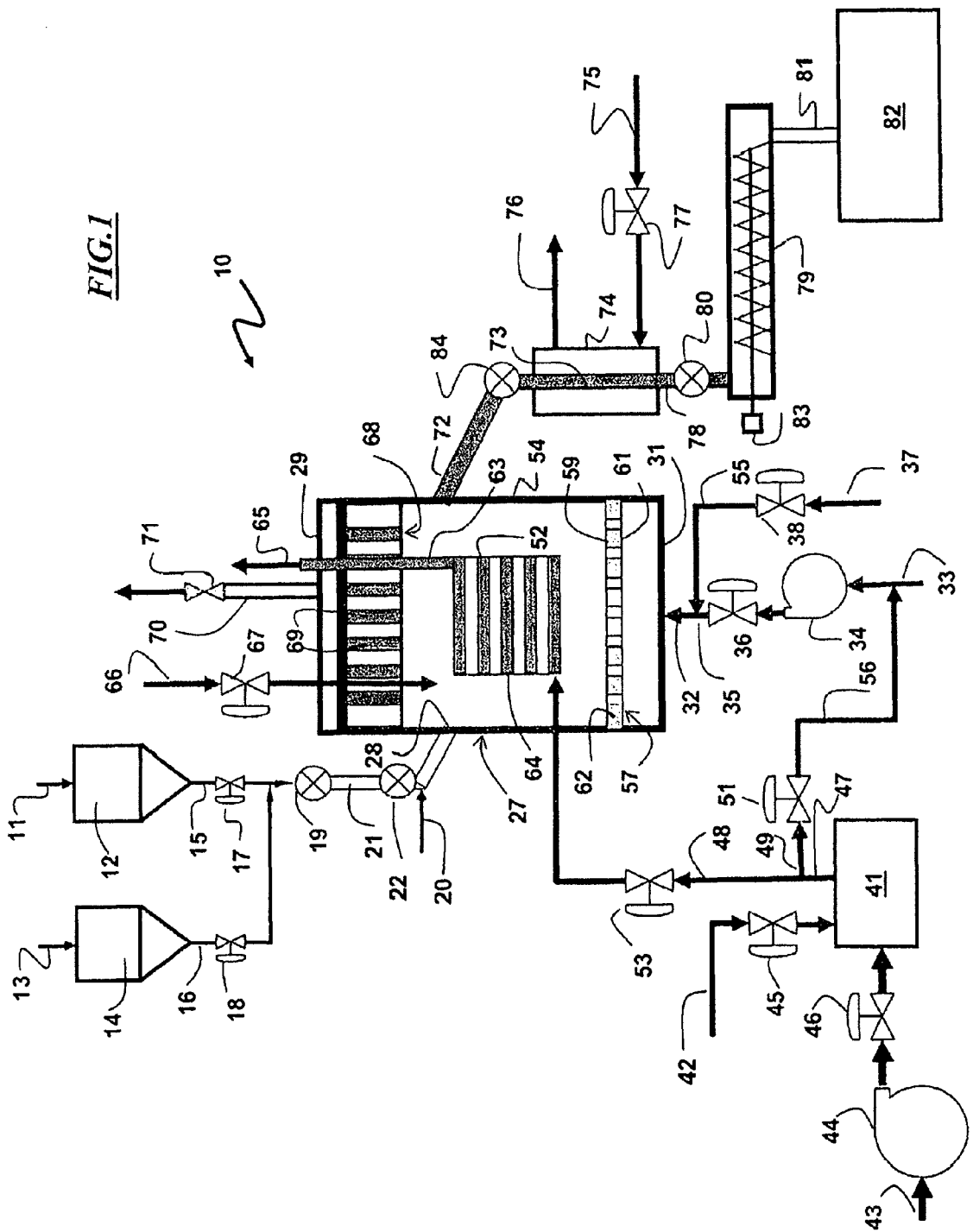
FIG. 1 is a schematic illustration of a first embodiment of an apparatus for carrying out the present method for calcining gypsum.

Referring now to FIG. 1, a system for calcining gypsum is generally designated 10. An advantage of the system 10 is that it is a continuous process for calcining lower water demand hemihydrate, as opposed to a batch process, which is the conventional approach. In the present process, the lower water demand is preferably obtained by increasing the production of alpha-hemihydrate crystals. It will be understood that the system 10 inherently incorporates the depicted apparatus, and is employed in the practicing of a method or process as described below. In the system 10, gypsum is supplied through an inlet or feed 11 into a hopper 12, which may be a pressurized hopper. The inlet 11 may include any type of conveyor or loading system that will be known to those skilled in the art. The gypsum is typically ground and provided in particulate form.

The disclosed apparatuses and techniques reduce the reliance on aridizing agents such as calcium chloride ($CaCl_2$). However, an aridizing agent in the form of a deliquescent salt or moisture absorbing salt may be employed. Therefore, an aridizing agent inlet 13 may be provided which leads to an aridizing agent hopper 14. Outlets 15, 16 from the hoppers 12, 14 respectively may be combined in a variety of ways, only one of which is shown in FIG. 1. As shown, the outlets 15, 16 each include their own control elements 17, 18 respectively to control the flow of material into a continuous metering device such as a lock 19, which is preferably a rotary lock. An air pressure line 20 provides pressure to an L-feeder 21 which delivers the feed under pressure to a pressurized reactor 27.

An additional control valve 22 may be disposed in the air pressure line 20 or between the line 20 and the L-feeder, or between the L-feeder and the inlet 21. It will be noted that FIG. 1 discloses only some, but not all of the control elements that may be needed for the system 10 as will be apparent to those skilled in the art.

Instead of the lock 19 and the L-feeder 21, a dual continuous metering device or dual lock vertical feeder (best seen in FIG. 2 and described below) may be employed which relies upon a longer vertical column of gypsum feed to pressurize the feed column as opposed to relying upon the pressurized air supply 20. Two rotary valves or locks are utilized including a lower valve close to the inlet of the reactor 27 and an upper valve disposed higher on the column closer to the gypsum hopper 12. This type of arrangement is known to those of ordinary skill in the art.

While kiln type reactor vessels are known for calcining gypsum, an advantage of the present vessel 27 is that it is pressurized. In the preferred embodiment, the vessel 27 is designed to maintain 14.7 psia (1 atm (gauge) to 55.3 psia (3.8 atm) (gauge).

It is preferred that the reactor vessel 27 provides a fluidized bed of gypsum material between its top portion 29 and a bottom portion 31. Calcination of the gypsum takes place in this fluidized bed. At the bottom portion 31 of the reactor vessel 27, an inlet 32 is provided for receiving one or more fluid flows including, for example: (i) pressurized air provided from an air inlet 33 that leads to a blower 34 which includes an outlet 35 and a control valve 36 that are in fluid communication with the reactor inlet 32; (ii) steam provided from a steam inlet 37 which is in communication with the inlet 32 by way of a steam control valve 38 and a steam outlet 55; and (iii) combustion gases from a burner 41 which combusts fuel received from a fuel supply 42 using compressed air provided through an air inlet 43 and a blower 44. Control elements for the fuel line 42 and air line 43 are shown at 45, 46 respectively. The type of fuel used is not important and may vary from natural gas or other light hydrocarbon gas (e.g., propane, butane, etc.) to oil or coal, depending upon location and availability. The steam is added for controlling humidity in the reactor 27 as well as for heating purposes. It is contemplated that water may also or alternately be injected into the reactor 27.

An outlet 47 of the burner 41 is diverted or split into the outlets shown at 48, 49. The outlet 49 is directed toward the reactor bottom inlet 32 and may pass through an additional control element 51. Representing the other portion of the burner output, the outlet 48 is directed toward a heat exchanger 52 used for heating the fluidized bed. A control element 53 is provided for controlling the flow of heat, preferably in the form of hot combustion gases from the burner 41. It is preferred that the heat exchanger 52 is disposed at a midsection 54 of the pressurized reactor vessel 27 and in the middle of the fluidized bed created by the upward flow from the bottom inlet line 32. Thus, using any one or more of pressurized air from the outlet 35, steam from the outlet 55 and combustion gases from the line 56, a pressurized upward fluid flow is provided in the reactor 27 that, in combination with the gypsum from the inlet 21, creates a fluidized bed within the reactor 27. While the use of the heat exchanger 52 is preferred in that it heats the fluidized bed indirectly, it is also contemplated to use other heat sources, including direct or indirect types for increasing the temperature of the fluidized bed to the desired ranges discussed below. For example, combustion gases and/or steam can directly heat the bed.

A perforated, generally planar air distributor is shown at 57 to facilitate a uniform upward fluid flow through the vessel 27 and the creation and maintenance of the fluidized bed. In the preferred embodiment, the air distributor 57 includes two perforated plates 59, 61 with an optional fiber mat 62 sandwiched therebetween. The details of the air distributor 57 are not germane to this disclosure and therefore the details are not illustrated. One of ordinary skill in the art will realize that a variety of air distributors used in calcining reactors and fluidized bed reactors can be employed. See, e.g., U.S. Pat. No. 7,175,426 which is incorporated by reference. If a fiber mat 62 is used, the preferred mat is a silica fiber mat selected for its ability to withstand heat. The air distributor 57 may be extended uniformly across the vessel 27 as shown or may comprise a plurality of individual pads, each comprising a mat sandwiched between perforated plates.

In the preferred embodiment, the heat exchanger 52 includes a vertical pipe 63 and two or more spiral horizontal pipes 64 within the upward flow path through the reactor vessel 27. An outlet from the heat exchanger 52 is in communication with a stack 65. Thus, metered gypsum enters the reactor vessel 27 through the top inlet 28 and falls downward until it is met by the upward hot fluid flow passing through the air distributor 57 as shown in the drawing. Heat is provided through the various piping 63, 64 of the heat exchanger 52. As discussed above, the heat is preferably provided by the line 48 from the burner 41. The temperature in the outlet 47 from the burner 41 will typically range from about 1482 to about 1760° C. (from about 2700 to about 3200° F.). The temperature of the heat exchanger exhaust gases passing through the heat exchanger exhaust 65 will range from about 232 to about 316° C. (from about 450 to about 600° F.).

It is contemplated that the temperature within the reactor vessel 27 ranges from about 121 to about 177° C. (from about 250 to about 350° F.), more preferably from about 138 to about 149° C. (from about 280 to about 300° F.). Steam is currently the preferred source of moisture, which may be provided through the steam inlet pathway 37, 55. However, water may be added to the reactor vessel through a water inlet 66 which, of course, may include a control element 67. The water inlet 66 should be coupled to an atomizer (not shown) as will be apparent to those skilled in the art. The total pressure within the vessel 27 may range from about 14.7 psia to 55.3 psia (from about 1.0 to about 3.8 atm) (gauge).

The top portion 29 of the reactor vessel 27 preferably includes a dust collector 68 which typically includes a plurality of vertically aligned bags 69 that trap fine particles of calcined gypsum dust and return it to the mid-portion 54 of the reactor vessel 27. A kettle exhaust stream or reactor outlet is shown at 70 with a control valve 71 and releases filtered exhaust gases from the dust collector 68. At least one mechanical agitator is preferably provided, being preferably located in the reactor vessel 27 between the air distributor 57 and the heat exchanger 52 to facilitate circulation of the fluidized gypsum.

Calcined gypsum product flows through a product outlet 72 and into a stand pipe 73. The product outlet 72 is preferably located above the heat exchanger 52 and below the dust collector 68 to receive an upper margin of the fluidized bed for removal. In addition, the outlet 72 typically will include its own control element (not shown). To ensure that the product is suitably dry, the stand pipe 73 passes through a second heat exchanger 74 which receives steam or heating medium such as combustion gases, exhaust gas, oil or the like from a second steam or heating medium inlet 75. It is contemplated that the second heat exchanger 74 prevents retained water vapor flowing with the gypsum product from condensing. A steam or heating medium outlet is shown at 76 and a control element at 77. The dried calcined hemihydrate product flows through an outlet 78 and a continuous metering device such as a lock 80, similar to the lock 19, into a screw conveyor 79 which delivers the product through a line 81 to a storage container, vessel, train car, truck bed or area 82. The motor for the screw conveyor is shown at 83. Obviously, other types of conveyor systems can be used and will be apparent to those of ordinary skill in the art after reading this disclosure. It is preferred that an additional continuous metering device 84 is placed at an inlet of the standpipe 73 to maintain a pressure seal within the reactor 27.

Figure 2:
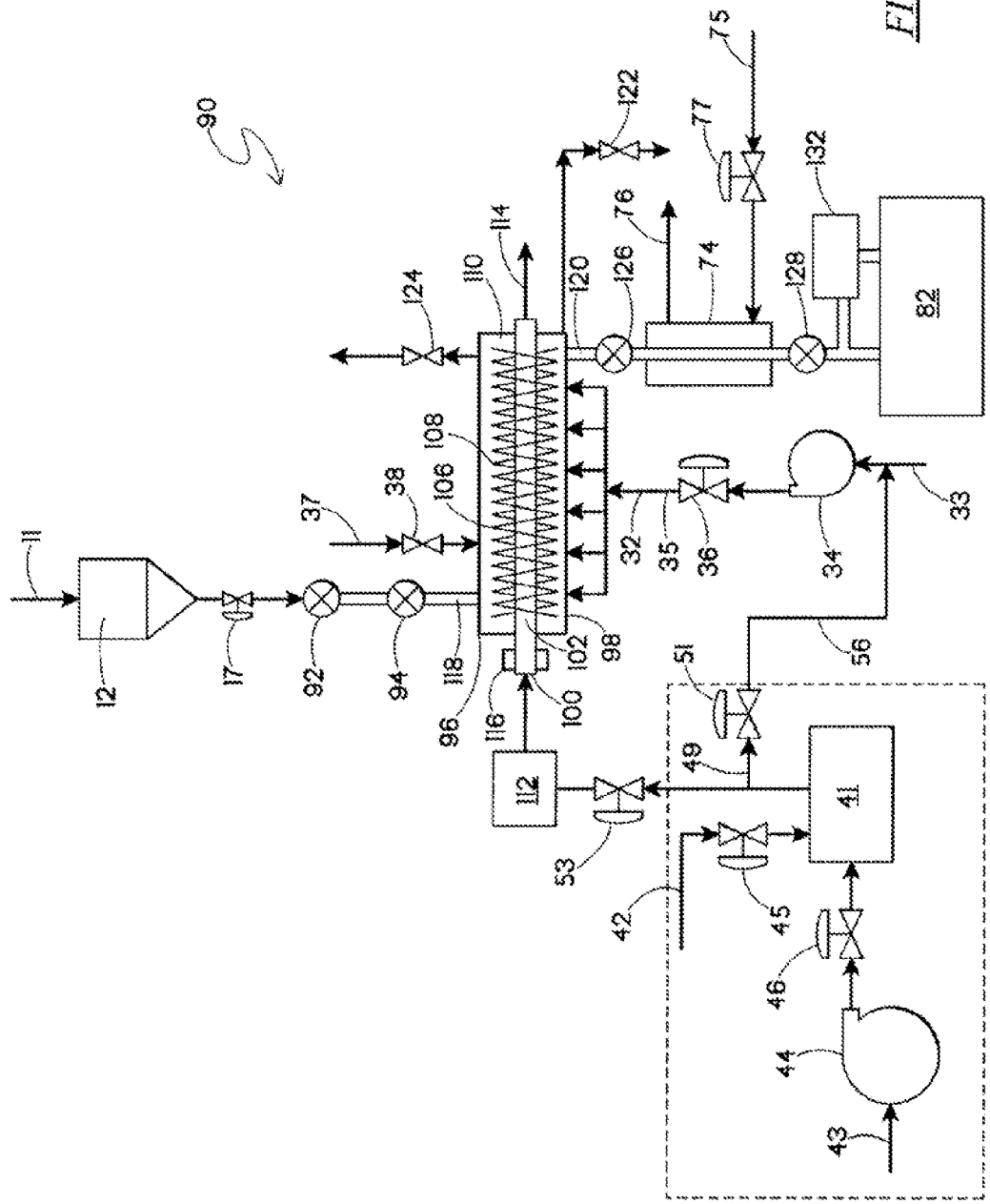
FIG. 2 is a schematic illustration of another embodiment of an apparatus for carrying out the present method for calcining gypsum.
Figure 3:
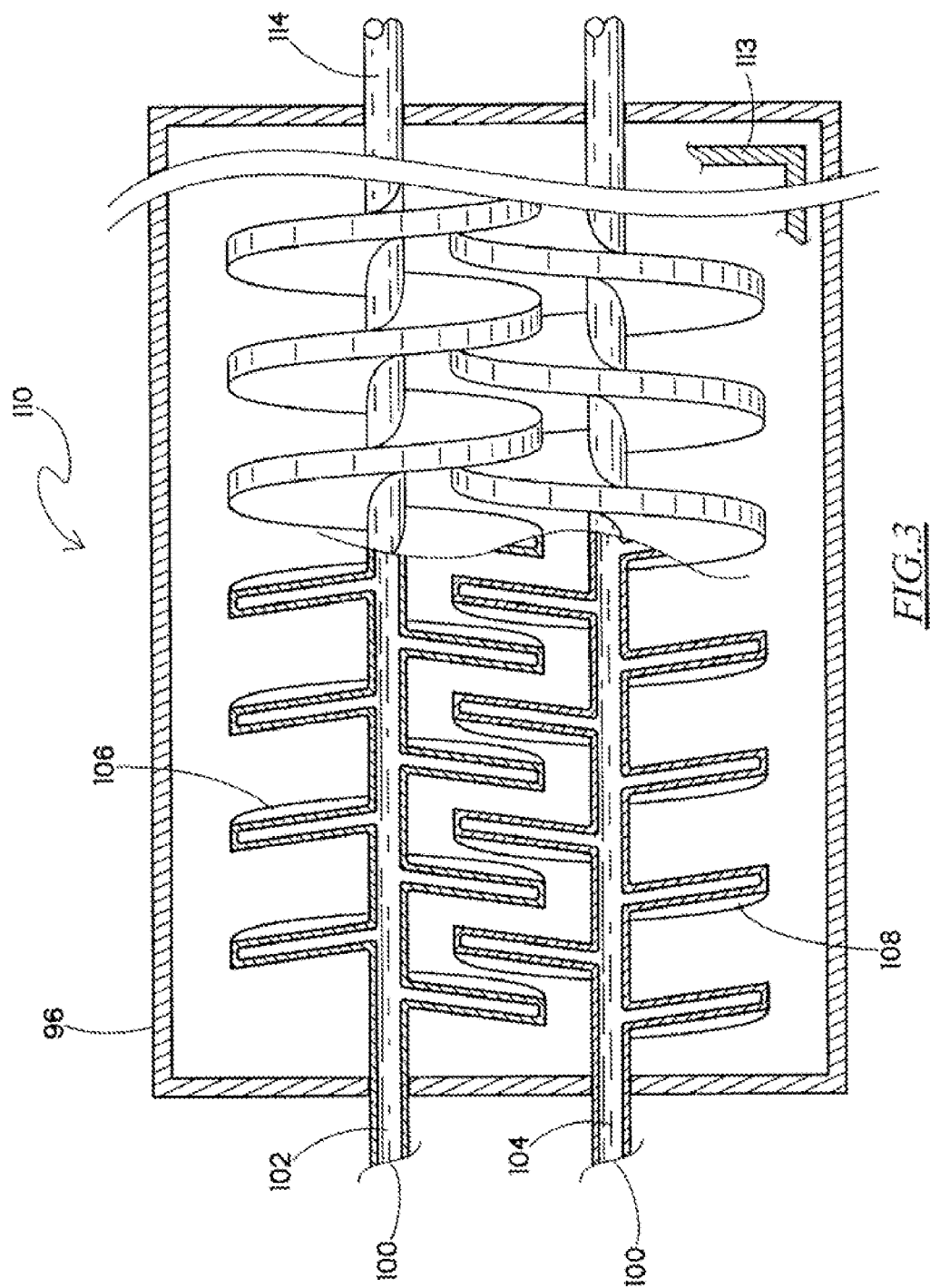
FIG. 3 is a top view in partial cross-section of the double screw counter-rotating auger depicted in FIG. 2.

Referring now to FIGS. 2 and 3, an alternate embodiment of the present system is generally designated 90. Components shared with the system 10 are designated with identical reference numbers. One distinction between the system 90 and the system 10 is that instead of the single lock 19 and the L-feeder 21, a dual lock arrangement, 92, 94 is employed to provide a continuous flow of gypsum from the hopper 12 and also to maintain pressure in a pressurized fluidized reactor, generally designated 96. In the preferred embodiment, the lower lock 94 feeds directly, by gravity, into the reactor 96.

Compressed air is injected by the blower 34 through the control valve 36 into a perforated housing 98 of the reactor 96 to fluidize the bed of gypsum in the reactor. Heated gas, oil or steam is continuously injected into an inlet 100 at an end of at least one, and preferably two hollow auger shafts 102, 104 including hollow intermeshing helical auger blades 106, 108 that are part of an adjustable speed, self-cleaning double screw counter-rotating auger 110 (best seen in FIG. 3) disposed within the reactor 96 to calcine the fluidized bed of gypsum. While it is preferred that they are disposed in spaced, horizontally oriented, parallel relationship to each other, it is contemplated that the two hollow auger shafts 102, 104 may be positioned in different ways relative to each other within the reactor 96.

As is the case with the system 10, heated fluid such as air or oil is provided to the inlet 100 by virtue of the shafts 102, 104 being in fluid communication with a heat exchanger 112, such as a boiler or the like, which in turn is supplied by the burner 41. Hot fluid is thus circulated within each shaft 102, 104 and the associated auger blades 106, 108 to heat the gypsum within the pressurized reactor 96. In the preferred embodiment, the heated fluid is ultimately passed from an outlet 114 of each shaft 102, 104 for recirculation to the burner 41.

A power source 116, preferably a variable speed motor, is operationally connected to at least one and preferably both of the shafts 102, 104 as is known in the art to rotate the shafts, and thus turn the auger blades 106, 108. Due to the helical shape of the auger blades, gypsum in the reactor 96 will be moved from an end of the reactor adjacent a reactor inlet 118 to an opposite end adjacent a reactor outlet 120. In the preferred embodiment, the auger blades 106, 108 are intermeshed with each other so that as the shafts 102, 104 rotate, residual gypsum on either blade is removed by close rotating action of the adjacent blade. It will be seen from FIG. 3 that the blades 106, 108 overlap each other almost their full radius. Another feature of the present reactor 96 is that the rotational velocity of the shafts 102, 104 may vary to suit the application. Different gypsum particle sizes and/or residence time requirements may require different shaft rotational velocities. Thus, the adjustable speed, double screw counter-rotating auger 110 continuously conveys the calcined fluidized bed of gypsum from the reactor inlet 118 to the reactor/product outlet 120.

The desired vapor pressure and relative humidity in the reactor 96 is maintained by the steam generated by calcination and injecting steam with the combustion gases and air at inlet 37, which is also usable for increasing the temperature of the fluidized bed in the reactor 96. Combining steam with the combustion gases helps to avoid condensation in the reactor. While shown with a single wall perforated housing 98, the reactor 96 may also include a double wall steam jacket 113 for additional heating of the calcined fluidized bed of gypsum. The reactor housing 98 preferably includes a condensation discharge valve 122 which releases condensation that builds up inside the reactor 96. Also, a safety relief valve 124 is provided to release pressure within the reactor 96 if preset levels are exceeded. If desired, a similar valve is contemplated for the system 10.

A continuous metering device 126 similar to the units 19, 92 and 94 discussed above helps maintain reactor pressure and continuously feeds the calcined gypsum from the reactor 96 to the second heat exchanger 74. In the preferred embodiment, the second heat exchanger 74 is used to maintain the temperature and moisture level of the calcined gypsum exiting the reactor 96. After exiting the second heat exchanger 74, a second continuous metering device 128 helps maintain pressure in the second heat exchanger 74 and continuously feeds the calcined gypsum into the storage area 82. Also, multiple metering devices (126, 128) are contemplated for use with the second heat exchanger 74 in the system 10. Upon exiting the second heat exchanger 74, the calcined gypsum may be transferred to a comminution mill 132 which simultaneously heats and grinds the calcined hemihydrate. The heated mill is heated by combustion gases. As is known in the art, a ball or tube mill or the like is contemplated.

Figure 4:
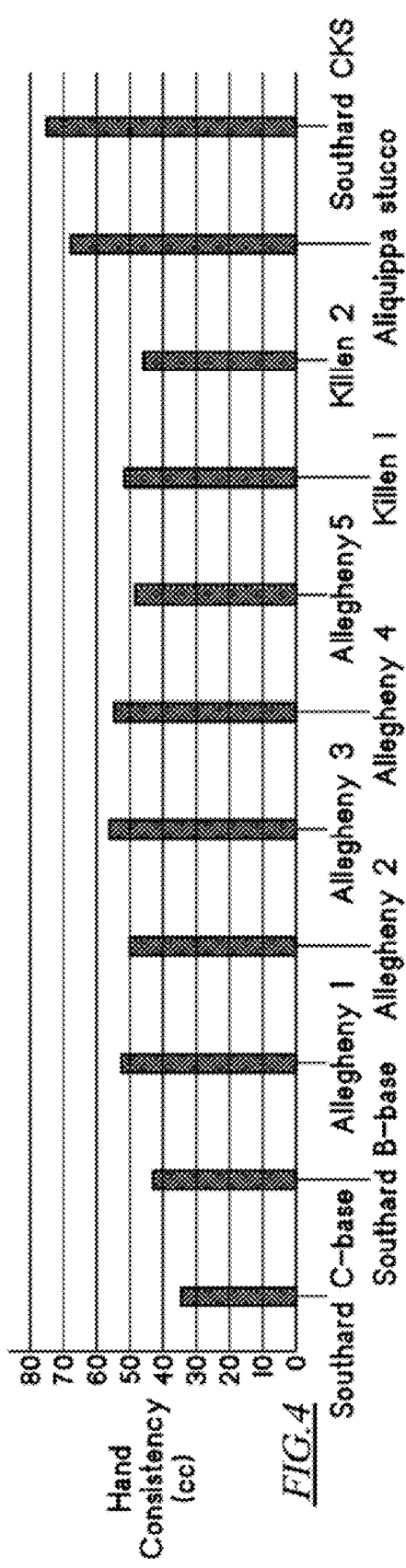
FIG. 4 is a bar graph comparing water demand of different stuccos.
Figure 5:
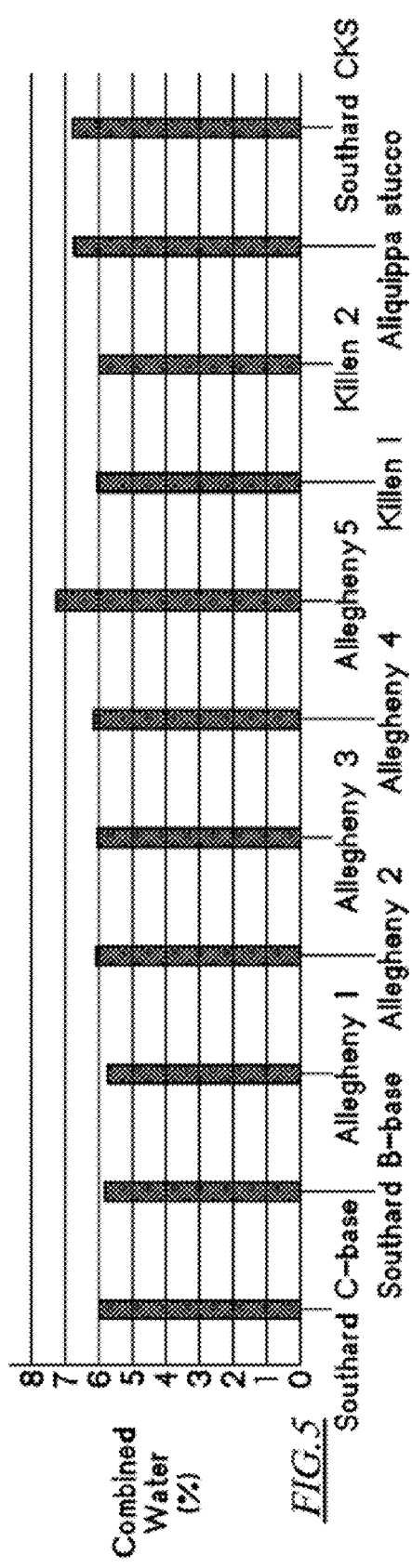
FIG. 5 is a bar graph comparing combined water of different stuccos.

Referring now to FIGS. 4-7, the FIG. 4 bar graph displays results of analysis of the calcined gypsum product of the existing calcination processes as well as lab facilities using pressurized calcination on gypsum source material from a variety of locations. In FIGS. 4 and 5, the Southard C-base and B-base values are the result of conventional calcination of a slurry and requires relatively more energy. Ideally, the pressurized calcination should approximate the values of calcined B-base hemi-hydrate. The Allegheny and Killen values are the result of pressurized calcination using the Chemineer laboratory technique discussed below. The Aliquippa and Southard CKS values are conventional beta-hemihydrate stucco produced in a kettle. The results show that water demand based on hand consistency measurements (the water required for 100 g of stucco) for different types of stuccos varies from about 36 cc to 75 cc. The results indicate a lower water demand using pressurized calcination when compared to conventional kettle-calcined beta-hemihydrate.

Figure 6:
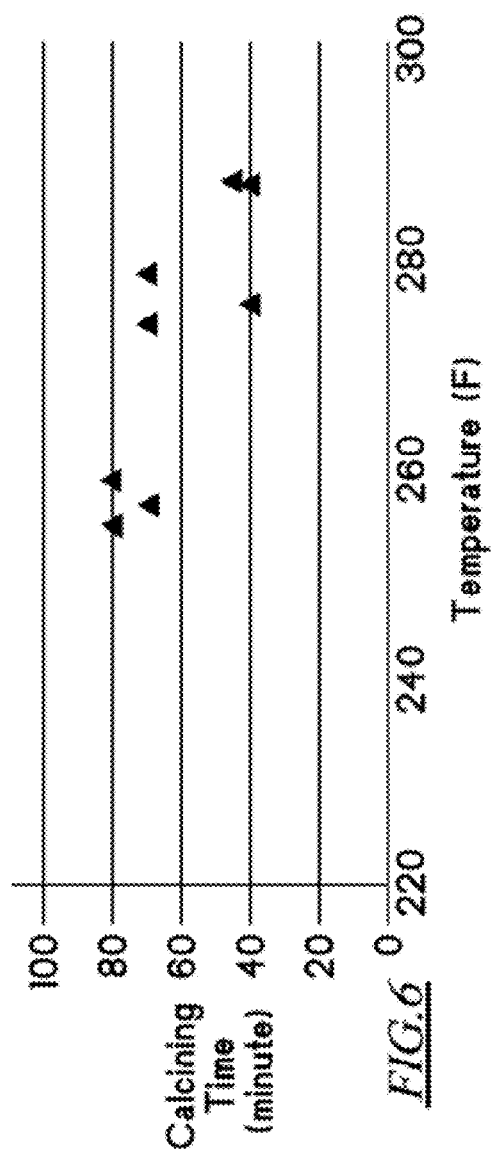
FIG. 6 is a graph illustrating the relationship between calcination time and reactor temperature.
Figure 7:
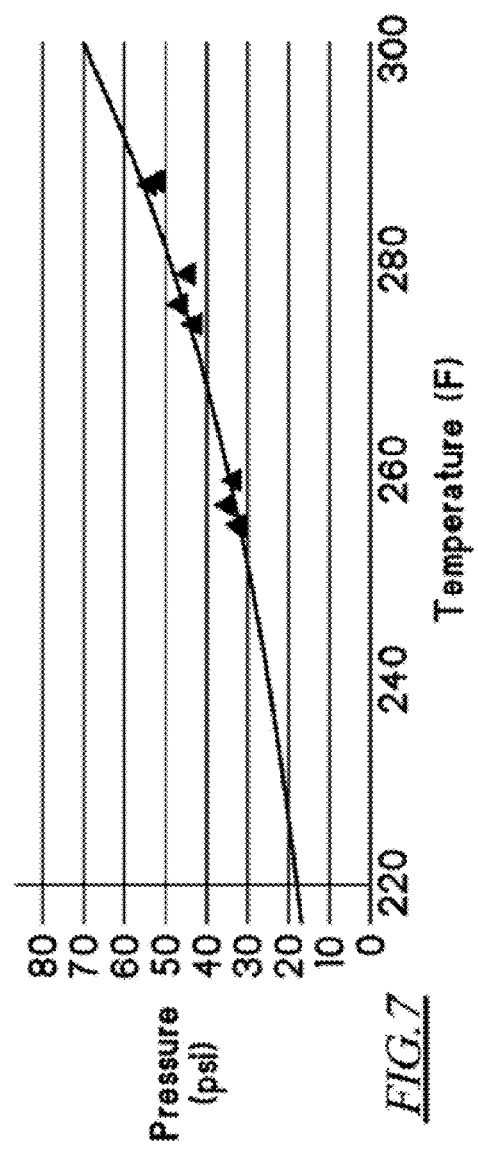
FIG. 7 is a graph illustrating the correlation between calcination pressure and reactor temperature.

FIG. 5 demonstrates that (%) combined water varies from about 5.8% to about 7.2%, regardless of the type of stucco or the type of calcination. This range is required to produce standard hemi-hydrate. FIG. 6 indicates that calcining time decreases as reactor temperature increases. FIG. 7 illustrates that reactor pressure increases with increases in reactor temperature.

TABLE 1

Summary of Chemineer unit operational conditions and test results

| Run conditions | Run1 | Run2 | Run3 | Run4 | Run5 | Run6 | Run7 | Run8 |
|---|---|---|---|---|---|---|---|---|
| Material | Fort Dodge | Allegheny FGD | Allegheny FGD | Allegheny FGD | Allegheny FGD | Allegheny FGD | DP&L Killen | DP&L Killen |
| Purity (%)/PS (μm) | 93.4/<300 | 98.9/84.5 | 98.9/84.5 | 98.9/84.5 | 98.9/84.5 | 98.9/84.5 | 95.0/48.1 | 95.0/48.1 |
| Land Plaster (g) | 1000 | 1000 | 1000 | 1000 | 1000 | 1000 | 1000 | 1000 |
| Free Water (cc) | 130 | 130 | 100 | 75 | 75 | 75 | 75 | 75 |
| SA (g) | 0.5 | 0.5 | 0.5 | 0.5 | 0.5 | 0.5 | 0.5 | 0.5 |
| Seed (g) | 100 | 100 | 50 | 50 | 50 | 50 | 50 | 50 |
| Agitation set | Speed 2 17-1"SB | Speed 2 17-1"SB | Speed 1 15-1"SB | Speed 1 10-1"SB | Speed 1 5-1"SB | Speed 1 15-1/2"SB | Speed 1 5-1"SB | Speed 1 5-7/8"SB |
| Pressure (psig) | 30 | 39 | 38 | 30 | 20 | 20 | 18 | 30 |
| Temperature (F.) | 278.0 | 286.9 | 287.2 | 279.2 | 261.0 | 260.6 | 253.4 | 273.8 |
| Humidity (g/ft3) | 737.4 | 843.4 | 846.9 | 746.1 | 579.1 | 579.8 | 520.3 | 695.5 |
| Duration (min.) | 20 + 50 + 100* | 10 + 30 + 35* | 15 + 30 + 20* | 20 + 30 + 30* | 20 + 60 + 30* | 10 + 60 + 20* | 20 + 60 + 35* | 0 + 40 + 15* |
| CW (%) | 5.681 | 5.695 | 6.104 | 6.078 | 6.191 | 7.147 | 6.081 | 5.942 |
| PS (micron) | 4.576 | 2.91 | 3.45 | 3.97 | 3.40 | 8.84 | 4.57 | 11.97 |
| Consistency (cc) | 45 | 53 | 50 | 56 | 55 | 48 | 52 | 46 |

(Southard B-base alpha-stucco as reference: CW = 5.923%, PS = 11.57 microns, WD = 42 cc)
PS: Particle Size
FGD: Flue Gas Desulfurization
SA: Succinic Acid
SB: Steel Balls
CW: Combined Water
*The time is heating + calcining + drying time Referring now to Table 1, a series of batch calcinations using Fuel Gas Desulfurization (FGD) gypsum and natural rock were carried out by a laboratory sized, Chemineer pressurized steam reactor (Chemineer, Inc., Dayton, Ohio 45401). Calcination conditions were recorded including temperature, pressure, humidity, calcination time, initial free moisture, agitation and grinding. Crystal modifier and sees were used in the calcination. The characteristics of produced stucco, such as particle size, combined water crystal structure, water demand (hand consistency, slump size) and set time were compared with B-base stucco produced at the USG Southard plant.

Referring now to FIGS. 8a-f, the Chemineer unit laboratory tests were conducted with raw gypsum materials and added water to maintain a free or surface moisture level of 7.5 to 13% to approximate the free moisture of FGOD material. Succinic acid as crystal modifier was dissolved in water and C-base stucco as a crystal seed were added with raw gypsum before calcination. Stainless steel balls and agitation were applied to grind and keep the particles from segregation. After calcining, the stucco was dried in the Chemineer unit under ambient pressure. The produced stucco passed a 50 mesh sieve and was tested for combined water and the crystal structure was checked using Scanning Electron Microscopy (SEM). Under the proper calcination conditions, both natural and FGD synthetic gypsum can be used in a non-slurry process to produce low water demand stucco with alpha-hemihydrate crystal structure. The before and after characteristics of the crystals are depicted in FIGS. 8a-f. FIG. 8a is the crystal structure of B-base stucco. FIGS. 8b-c are views of the feed material, and FIGS. 8d-f are views of the calcined crystals, which reflect the desired blocky structure of alpha-hemihydrate crystals.

An example method for calcining gypsum includes injecting gypsum into a top portion of a pressurized reactor; injecting heated air, steam and a portion of a combustion gas flow from a burner into a bottom portion of the pressurized reactor to create a fluidized bed of gypsum within the reactor; heating the pressurized reactor to a temperature ranging from about 121 to about 149° C. (from about 250 to about 300° F.) with a heat exchanger that passes through the fluidized bed of gypsum and that uses a remaining portion of the combustion gas flow from the burner; maintaining a vapor pressure in the pressurized reactor in the range of from $1.01 \times 10^5$ to $3.85 \times 10^5$ Pa (from 1.0 to 3.8 atm); and maintaining the temperature in the pressurized reactor ranging from about 121 to about 149° C. (from about 250 to about 300° F.).

Using the above-described apparatus and techniques, an improved calcium sulfate product with a higher percentage of alpha-type hemihydrate and a lower percentage of beta-hemihydrate can be achieved. In short, using the disclosed apparatus and employing the disclosed parameters and methods results in a calcium sulfate product with a lower water demand and improved properties. Furthermore, the use of aridizing agents is optional but not required.

Further, the average particle size of the gypsum feed is not crucial as the fluidization parameters may be changed to accommodate a variety of particle sizes. In general, gypsum feed having an average particle size ranging from 50 μm to 1 mm may be employed. The resulting hemihydrate product may be ground later depending upon the desired end product or application.

Use of combustion gases from the burner 41 in combination with steam ensures that the inlet fluid flow 32 is sufficiently hot enough so as to prevent any condensation in the reactor vessel 27 or near the air distributor 57. Thus, one advantage of combining the combustion gases from the conduit 56, pressurized air from the conduit 35 and steam from the conduit 55 into the combined inlet 32, is that increasing the humidity using steam will not have the adverse effect of creating condensation within the reactor 27. Water may be added to the bottom inlet 32, but steam is preferred due to the risk of condensation.

While only certain embodiments have been set forth, alternatives and modifications will be apparent from the above description to those skilled in the art. These and other alternatives are considered equivalents and within the scope of this disclosure and the appended claims.

What is claimed:

1. A method for calcining gypsum comprising:
injecting gypsum into a pressurized reactor; injecting combustion gases and air into the pressurized reactor to create a fluidized bed of gypsum in the reactor; and heating the fluidized bed of gypsum in the pressurized reactor to sufficiently calcine the gypsum to form a calcined hemihydrate; combusting fuel and air in a burner to create the combustion gases; diverting a portion of the combustion gases to the pressurized reactor to create the fluidized bed; and directing a remaining portion of the combustion gases to a heat exchanger used for heating the fluidized bed.

2. A method for calcining gypsum comprising:
injecting gypsum into a pressurized reactor; injecting combustion gases and air into the pressurized reactor to create a fluidized bed of gypsum in the reactor; and heating the fluidized bed of gypsum in the pressurized reactor to sufficiently calcine the gypsum to form a calcined hemihydrate; wherein the heating is accomplished with a heat exchanger and wherein the method further comprises removing the calcined gypsum from the pressurized reactor and heating the calcined gypsum with a second heat exchanger.

3. A method for calcining gypsum comprising;
continuously injecting gypsum into a pressurized reactor; heating the gypsum to form a calcined hemihydrate with a lower water demand hemihydrate, the calcined hemihydrate having a water to stucco ratio in the approximate range of 0.45-0.55; and moving the dried calcined hemihydrate from a second heat exchanger through a discharge valve into a heated mill which simultaneously heats and grinds the calcined hemihydrate.

4. An apparatus for continuously calcining gypsum comprising at least one gypsum hopper having a hopper inlet and a hopper outlet; said hopper outlet being in communication with a continuous meterin device pressurized reactor in communication with said continuous metering device wherein the pressurized reactor includes an adjustable speed double screw counter-rotating auger having hollow shafts and hollow blades that is disposed within the pressurized reactor to continuously heat and convey a fluidized bed of gypsum from an inlet of said reactor to an outlet of said reactor.

5. The apparatus of claim 4 wherein a valve feeder is in communication with a heated mill for drying and grinding the calcined hemihydrate.

* * * * *

UNITED STATES PATENT AND TRADEMARK OFFICE
CERTIFICATE OF CORRECTION

PATENT NO. : 7,815,889 B2  
APPLICATION NO. : 12/388793  
DATED : October 19, 2010  
INVENTOR(S) : Luan It is certified that error appears in the above-identified patent and that said Letters Patent is hereby corrected as shown below:

In col. 8 line 55, delete "FGOD" and replace with --FGD--.

In col. 10 line 39, delete "meterin device pressurized" and replace with --metering device; and a pressurized.

Signed and Sealed this
Twentieth Day of December, 2011

David J. Kappos
*Director of the United States Patent and Trademark Office*